United States Patent [19]

Kapcio et al.

[11] Patent Number: 4,980,828

[45] Date of Patent: Dec. 25, 1990

[54] MEDICAL IMAGING SYSTEM INCLUDING USE OF DMA CONTROL FOR SELECTIVE BIT MAPPING OF DRAM AND VRAM MEMORIES

[75] Inventors: James Kapcio, Mentor; Frederick C. Mailey, S. Euclid; Joseph Y. Pai, Mayfield Hts; Michael J. Petrillo, Euclid, all of Ohio

[73] Assignee: Picker International, Inc., Highland Hts, Ohio

[21] Appl. No.: 276,144

[22] Filed: Nov. 25, 1988

[51] Int. Cl.[5] .............................................. G06F 15/38

[52] U.S. Cl. .......................... 364/413.13; 365/230.05; 340/799

[58] Field of Search ................... 364/413.13; 340/799; 365/230.05, 189.04, 189.05, 413.16, 413.19

[56] References Cited

U.S. PATENT DOCUMENTS

| | | | |
|---|---|---|---|
| 4,636,783 | 1/1987 | Omachi | 340/799 |
| 4,723,226 | 2/1988 | McDonough et al. | 340/799 |
| 4,740,922 | 4/1988 | Ogawa | 365/189.04 |
| 4,773,044 | 9/1988 | Sfarti et al. | 365/238 |
| 4,777,485 | 10/1988 | Costello | 340/799 |
| 4,789,960 | 12/1988 | Willis | 364/900 |

*Primary Examiner*—Michael R. Fleming
*Assistant Examiner*—Gail O. Hayes
*Attorney, Agent, or Firm*—Fay, Sharpe, Beall, Fagan, Minnich & McKee

[57] ABSTRACT

A system is provided for a display of CT cine images stored in a hybridized memory including both dynamic random access memory (14) and video random access memory frame buffer (16). The system includes memory address space which is allocated between the VRAM and DRAM. Non-linear, chained direct memory access control (22) provides a system to write a series of 640×512 pixel images directly from the frame buffer at 60 frames per second. The chaining provides a means for skipping over unused addresses at the end of a display line, thus maximizing utilization of expensive VRAM memory.

20 Claims, 3 Drawing Sheets

MEDICAL IMAGING SYSTEM INCLUDING USE OF DMA CONTROL FOR SELECTIVE BIT MAPPING OF DRAM AND VRAM MEMORIES

BACKGROUND OF THE INVENTION

This application pertains to the art of video imaging, and more particularly to the art of formations of cine images in medical diagnostics imaging.

The invention is particularly applicable to medical imaging of the computed tomography ("CT") variety, and will be described with particular reference thereto. It will be appreciated, however, that the invention has broader applications such as in images generated by magnetic resonance or the like.

Non-invasive medical imaging is becoming an extremely useful and popular means by which valuable patient information is obtained. Presently, such images are obtained by computed tomography ("CT"), magnetic resonance ("MRI"), scintillation cameras, ultrasound, or the like.

Often such images are generated in a video display terminal ("VDT"), such as a cathode ray tube ("CRT"). Information for forming such video output is generally stored in digitized form in randomly accessible memory. The random access memory ("RAM") is selected via an address which specifies a memory location. That memory location stores information which dictates a small element of a picture or "pixel." A rectangular array of such pixels provides the video image. When a CRT is used as a display, memory which stores a video image is serially accessed and converted to analog, synchronously with a raster pixel clock and control signals, to provide a composite signal to generate a scan display.

The ability to provide sufficient information at an acceptable rate to a video memory becomes more difficult as image complexity increases. More complex images include more pixels or a greater palette of colors, and therefore require rapid access to more memory locations. This is further complicated when a series of individual images are to be serially displayed on a CRT in what becomes to be referred to as "cine" imaging.

Cine imaging provides for a means by which a series of related physiological images may be viewed serially. This provides a technician with valuable information on changes to a subject over a period of time.

Prior cine imaging was limited by a combination of pixel complexity of a display and the "shutter" speed at which sequential cine frames would be displayed. It would be desirable if a system could be provided with which a high resolution cine image would be displayable without perceptible flicker.

The present invention contemplates a new and improved cine imaging system which overcomes all of the above-referred problems, and others, and provides a high resolution, fast refresh, cine imaging system.

SUMMARY OF THE INVENTION

In accordance with the present invention, there is provided a medical imaging system which includes a scanner means for generating image data representative of a physical characteristic along at least a cross-sectional area of a subject or patient. A means is provided for digitizing data received from the scanner, and communicating such digitized data to an image processor. The image processor includes a main memory means adapted for non-concurrent storage and retrieval of digitized image data. A high-speed video memory means is provided for storage of digitized image data. The video memory means is adapted for concurrent and non-concurrent storage and retrieval of image data. A means is provided for communicating digitized image data stored in the video memory means to an associated video display terminal.

In accordance with a more limited aspect of the present invention, a means is provided for generating an address for directly accessing the main memory means with the video memory means.

In accordance with a still more limited aspect of the present invention, the address data generated for direct memory access includes an arbitrary row and column commencement address of a sequential address cycle, a column address extent, and a total transfer size, which thereby generates a selected area of memory for sequential access from which a video display will be generated.

In accordance with another aspect of the present invention, a method is provided for generating video images in conjunction with the foregoing means.

An advantage of the subject invention is provision of a system for generation of a high resolution medical image with comparably lower equipment cost.

Another advantage of the present invention is the provision of a system with which a series of cine images are displayable in high resolution.

Another advantage of the present invention is the provision of a system with which a series of high resolution cine images are generated without noticeable flicker or stepping.

Further advantages will be apparent to one of ordinary skill in the art upon a reading and understanding of the following specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENTS

Figure 1:
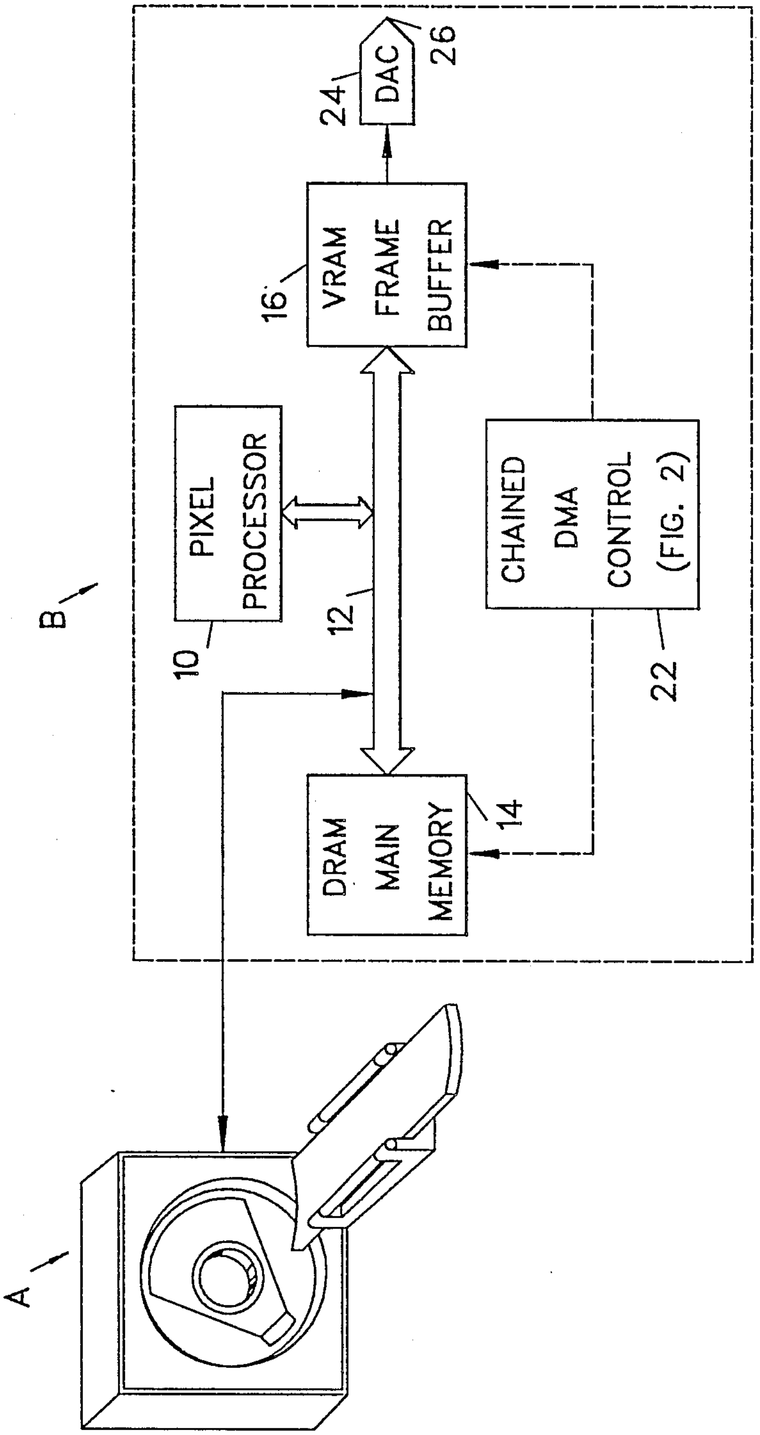
FIG. 1 is a block diagram of the imaging device of the present invention.

Turning now to the drawings wherein the showings are for the purposes of illustrating the preferred embodiment of the invention only and not for the purpose of limiting the same, FIG. 1 illustrates a medical imaging apparatus A in data communication with an image processor B. The imaging device A is illustrated as a computed tomography scanner which is adapted to output digitized image data. It will be appreciated, however, that the imaging device is suitably comprised of any medical imager which is adapted for generation of digitized image data.

The image processor B includes a pixel processor 10 in data communication, through a bus 12, to a system memory. In the preferred embodiment, the pixel processor 10 is comprised of a Motorola 68020 microprocessor running in the range of 16–25 Mhz. It will be appreciated, however, that various other processors are suitably adaptable for the pixel processing functions.

The system memory includes dynamic random access main memory ("DRAM") 14 and video random access memory ("VRAM") 16. VRAM is a dual port memory which provides an ability for dual port access (concurrent reads and writes). Transfers of data between the imager A, the pixel processor 10, the DRAM memory 14, and the VRAM memory 16, accordingly all occur via the bus 12. All operations of components of image processor B are synchronized by a system clock (not shown), as will be appreciated by one of ordinary skill in the art.

Data transfers are alternatively provided via the pixel processor 10, or directly via direct memory access ("DMA") control. Data transfers utilizing the pixel processor 10 must engage in a three-step operation. For example, data from the DRAM memory 14 is read into the pixel processor 10 via the bus 12. In a subsequent clock cycle, data is read from the pixel processor 10 to the VRAM 16. In the DMA mode, memory may, for example, be transferred in one cycle between the DRAM 14 and the VRAM 16. Such DMA transfers require, however, independent control. This is provided by the chained DMA control unit 22.

In the preferred embodiment, the VRAM covers 768K (786,432) bytes of memory; each byte comprising, 8 bits. Each pixel is defined by two bytes or 16 bits. This memory configuration allows for storage of an image. The VRAM 16 physically covers 768×512 pixels. The display area is 640×512 pixels. The image size is sized at 512 "horizontal" ×512 "vertical" pixels, with each pixel being assigned one of $2^{14}$ colors. It will be appreciated by one of ordinary skill in the art, however, that other memory sizes may be used to provide for varying degrees of image size or image complexity, such as resolution and coloration.

The chained DMA control 22 provides for selective linear or non-linear addressing of memory locations in DRAM 14 or VRAM 16. The functioning of DMA control 22 will be described with particularity below.

Output from the VRAM 16 is written to a digital-to-analog converter ("DAC") 24. An analog output 26 of the DAC 24 is communicated to an associated video display terminal such as a CRT (not shown).

Figure 2:
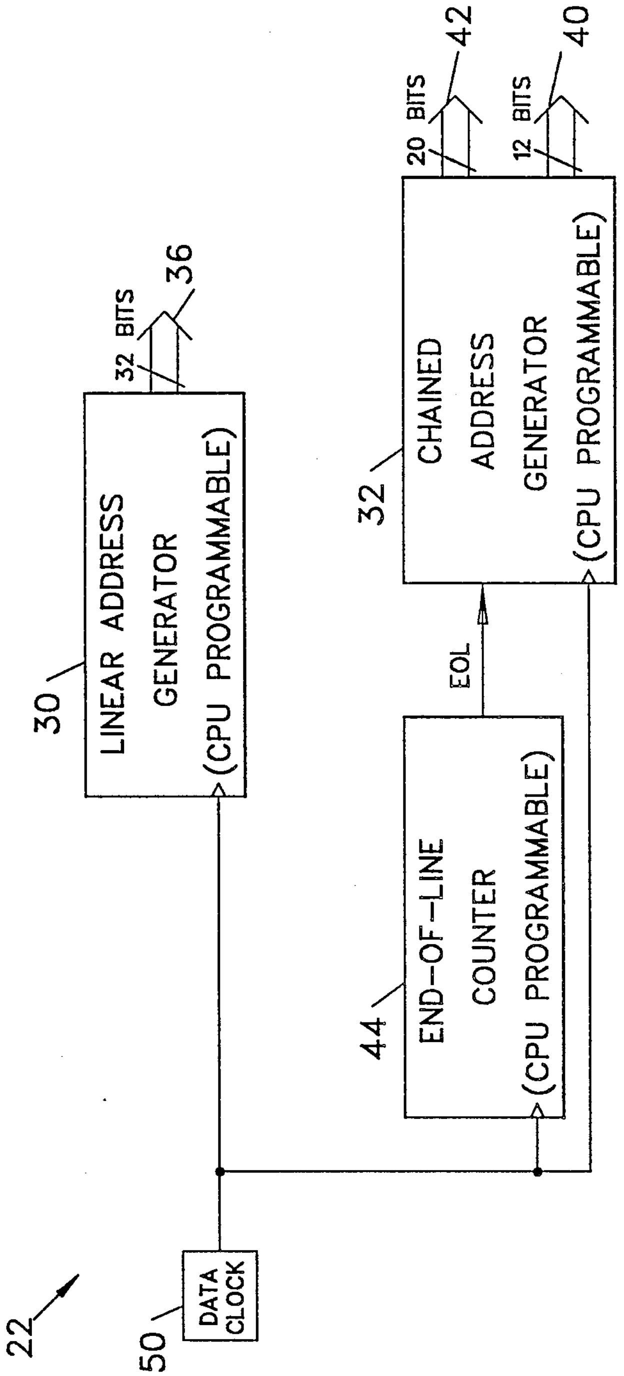
FIG. 2 is a block diagram of the chained DMA control unit of FIG. 1.
Figure 3:
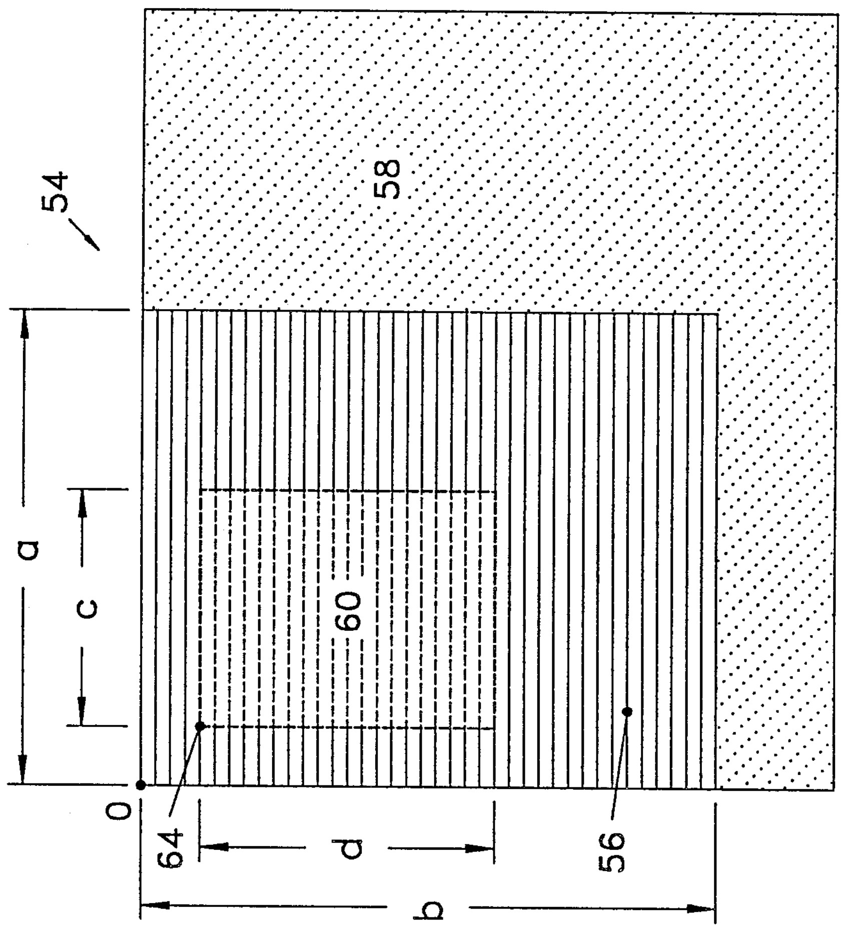
FIG. 3 is a memory map illustrating the non-linear addressing provided by the subject system.

Turning now to FIGS. 2 and 3, with continuing reference to FIG. 1, the chained DMA control 22 will be described with particularity. In the preferred embodiment, addresses of the memory 14, 16 are comprised of 32 bits. Addressing within the DMA control unit 22 is formed either linearly, via a linear address generator 30, or as a chained address, via chained address generator 32. The linear address generator 30 provides the standard, linear, sequential chain of memory address locations. This address is provided as a single 32 bit output 36. Parameters for commencement and completion of a linear address string are setable via interface with a central processing unit ("CPU"), such as pixel processor 10.

The chained address generator 32, similarly to the linear address generator 30, generates an address portion comprised of 32 bits. For purposes of discussion, the 32 bit address output from chain address generator 32 has been divided into a 12-bit column address portion 40 and a 20-bit row address portion 42. The designations "row" and "column" are utilized for ease in visualization of a corresponding VDT output. In actuality, a single 32-bit address is used. The column address is comprised of the least significant 12 bits of the address, while the row address portion is comprised of the most significant 20 bits thereof.

The chained address generator 32 is, similarly to the linear address generator 30, CPU programmable. An additional input to the chained address generator 32 is provided by an end-of-line counter 44, which provides an end-of-line signal EOL thereto. The end-of-line counter 44 is similarly CPU programmable. Relative interactions of the end-of-line counter 44 and the chained address generator 32 will be described with particularity below. The linear address generator 30, the chained address 32, and the end-of-line counter 44 are all synchronized to the system data clock which is illustrated at 50.

With particular reference to FIG. 3, and continuing reference to FIG. 2, the function of the chained address generator 32 and end-of-line address counter 44 will be described. FIG. 3 graphically illustrates a memory address space 54 which includes a column address extent a and a row address extent b. An arbitrary memory location 56 is defined by a unique row/column address in the form of ($a_i$, $b_i$). The column $a_i$ is dictated by the column address portion 40, while the row address $b_i$ is dictated by the row address portion 42. In the preferred embodiment, the memory address space 54 is defined as 2 megabytes, addressable from address 0 to address 1,048,575. The column address extent a is defined as $2^{12}$ addresses in banks of 4K each. Accordingly, the extent of each row is: (4,096n)−1, where n is defined as the row number. These 4K of column addresses per row are defined by the $2^{12}$ bits from the column address portion 40.

A VRAM space 60 is mapped as a portion of the memory address space 54. The VRAM space 60 is mapped over a portion of the memory address space 54, with the remainder 58 being reserved for expansion. The VRAM space 60 defines the output to be communicated to the digital-to-analog converter 24 (FIG. 1), and thereafter to the associated video display terminal. The extent of the VRAM space 60 is limited only by the VRAM present. As noted above, in the preferred embodiment, this includes 768K of total VRAM memory.

The VRAM 60 has stored data obtained from the imaging apparatus A (FIG. 1). The contents of the VRAM 60 are sequentially polled to form a video output which is communicated to an associated video display terminal. The DMA transfer is defined by a commencement point 64, a column extent c, and a total transfer size, which infers a row extent d by the relation:

$$d = \frac{\text{total bytes}}{c}$$

The total memory area of the VRAM which is available for image generation is dictated by a×b. This quantity is limited by the geometry of a selected video display.

Turning particularly to FIG. 2, with continued reference to FIG. 3, a row and column address representative of commencement point 64 is loaded into chained address generator 32, together with total byte count c×d. VRAM column extent c is preprogrammed into the end-of-line counter 44.

The chained address generator sequentially, at a rate dictated by the data clock 50, increments the column address portion 40 from the column of the commencement point 64. The end-of-line counter 44 similarly increments its column register synchronously with the data clock 50, comparing it after each such increment with the preprogrammed value of the VRAM column extent c therein. When this extent has been achieved, the counter 44 generates the end of line signal EOL, and communicates it to the chained address generator 32. After receipt of the EOL signal, the chained address generator increments its row address number to the next row, at the column address dictated by the commencement point 64. This continues until the total byte count d has been achieved, after which time the processor ends and the pixel transfer 20 regains control. In this fashion, a rectangular image of any size is written directly to the VRAM space 60.

Concurrently with the DMA writing of image data to the VRAM 16, data is also communicated for display through the DAC 24.

It will be appreciated that VRAM provides a means by which concurrent reads and writes of data stored therein are enabled. Such concurrent addressing and accessing of the VRAM memory provides a means by which sequential cine images are formed. The fast, nonlinear, DMA control provides a means for efficient utilization of expensive VRAM memory, and the provision of high resolution, flicker-free, display of cine images. VRAM provides a means by which image data stored therein is displayable concurrently with updates thereto. This increases efficiency of the transfer. This, combined with chained DMA provides for fast access to non-sequential display.

The invention has been described with reference to the preferred embodiment. Obviously, modifications and alterations will occur to others upon the reading and understanding of the specification. It is intended that all such modifications and alterations be included insofar as they come within the scope of the appended claims, or the equivalents thereof.

What is claimed is:

1. A medical image generating apparatus comprising:

scanner means for generating image data representative of physical characteristics along at least a cross-sectional area of subject;

digitizer means for digitizing the image data;

means for communicating digitized image data to an image processor;

the image processor comprising, a data bus, system memory including, main memory means for performing storage of digitized image data, the main memory means including means for selectively accessing the data bus so as to perform one of non-concurrent reads and writes of digitized image data stored therewith, and video memory means for performing storage of digitized image data, the video memory means being adapted for selectively accessing the data bus to perform one of a concurrent read and write and a non-concurrent read and write of data stored therewith to the data bus; and means for communicating digitized image data stored in the video memory means to an associated video display terminal.

2. The medial image generating apparatus of claim 1 wherein:

the main memory means includes means for selectively accessing digitized image data stored therewith in accordance with main memory address data;

the video memory means includes means for selectively accessing digitized image data stored therewith in accordance with video memory address data uniquely defined from the main memory address data;

the apparatus further includes address generator means for generating address data including the main memory address data and the video memory address data; and means for communicating address data generated by the address data generator means to at least one of the main memory means and the video memory means.

3. The medical image generating apparatus of claim 2 wherein the address generator means includes a pixel processor.

4. The medical image generating apparatus of claim 2 wherein the address generator means includes DMA controller means for controlling accesses to the system memory.

5. The medical image generating apparatus of claim 4 wherein the DMA controller means includes means for generating a selected sequential cycle of address data, which selected sequential cycle of address data defines an area of memory, the contents of which are to be communicated to the video display terminal.

6. The medical image generating apparatus of claim 5 wherein:

the address generator means includes means for generating the address data in accordance with a row address portion and a column address portion, and the DMA controller further includes means for defining a the selected sequential cycle of address data in accordance with at least one of, a row and column commencement address of the selected sequential cycle of address data;

a column address extent; and a total transfer extent.

7. The medical image generating apparatus of claim 6 wherein the DMA controller further comprises:

means for incrementing the column address portion from a column address portion dictated by the row and column commencement address;

means for incrementing the row address portion when the column address portion achieves the column address extent; and means for recommencing the selected sequential cycle from the row and column commencement address when the row address portion achieves the row address extent.

8. The method of claim 5 further comprising the steps of:

generating the address data in accordance with a row address portion and a column address portion, and defining a the selected sequential cycle of address data in accordance with at least one of, a row and column commencement address of the selected sequential cycle of address data;

a column address extent; and a total transfer extent.

9. The method of claim 8 further comprising the step of:

incrementing the column address portion from a column address portion dictated by the row and column commencement address;

incrementing the row address portion when the column address portion achieves the column address extent; and recommencing the selected sequential cycle from the row and column commencement address when the row address portion achieves the row address extent.

10. A method of medical image generation comprising the steps of:

generating image data representative of physical characteristics along at least a cross-sectional area of a subject;

communicating digitized image data to an image processor;

performing storage of digitized image data in a system memory including a main memory portion and a video memory portion;

selectively accessing digitized image data stored in the main memory portion by performance of one of non-concurrent reads and writes of digitized image data stored therewith, and selectively accessing digitized image data in the video memory portion by performance of one of a concurrent read and write and a non-concurrent read and write of data stored therewith; and communicating digitized image data stored in the video memory portion to an associated video display terminal.

11. The method of claim 10 further comprising the steps of:

generating address data for selectively accessing content of the system memory, the address data including main memory address data and video memory address data;

selectively accessing digitized image data in accordance with video memory address data uniquely defined from the main memory address data;

means for generating address data; and communicating an address to at least one of the main memory means and the video memory means.

12. The method of claim 11 further comprising the step of controlling a sequential accesses to at least one of the main memory means and the video memory means.

13. The method of claim 12 further comprising the step of generating a selected non-linear sequential cycle of address data, which selected sequential cycle of address data defines an area of memory, the contents of which are to be communicated to the video display terminal.

14. A medical imaging device comprising:

scanner means for generating image data representative of physical characteristics along at least a cross-sectional area of a subject;

digitizer means for digitizing the image data;

means for communicating digitized image data to an image processor;

the image processor comprising, a data bus, a randomly accessible system memory including, randomly addressable main memory means for performing storage of digitized image data, the main memory means including means for selectively accessing the data bus so as to perform one of non-concurrent reads and writes of digitized image data stored therewith, and randomly addressable video memory means for performing storage of digitized image data, the video memory means being adapted for selectively accessing the data bus to perform one of a concurrent read and write and a non-concurrent read and write of data stored therewith to the data bus;

direct memory access controller means for generating address data for sequentially accessing the system memory;

means for communicating digitized image data stored in the video memory means to an associated video display terminal.

15. The medical imaging device of claim 14 wherein the direct memory access controller means includes:

means for storage of row extent data representative of a row extent and a column extent representative of a column extent of a selected area of the system memory; and means for storage of commencement point data representative of a commencement row and commence column of the selected area of the system memory.

16. The medical imaging device of claim 15 further comprising incrementing means for incrementing an address generated by the direct memory access controller means.

17. The medical imaging device of claim 16 further comprising means for selectively altering the incrementing means in accordance with at least one of the row extent data, the column extent data, and the commencement point data.

18. The medical imaging device of claim 17 wherein the row extent and column extent of the selected area of the system memory correspond to rows and columns of a raster scan of a cathode ray tube.

19. The medical imaging device of claim 18 further comprising means for varying at least one of the row extent data, the column extent data, and the commencement point data, whereby extent of the selected area of the system memory is redefined.

20. The medical imaging device of claim 19 wherein the scanner means includes at least one of a computed tomography scanner and a magnetic resonance imager.

* * * * *